(12) United States Patent
Picavet

(10) Patent No.: US 10,375,967 B2
(45) Date of Patent: Aug. 13, 2019

(54) DEVICE FOR DISPENSING YEAST IN A BAKERY AND SYSTEM FOR DISPENSING YEAST IN A BAKERY

(71) Applicant: LESAFFRE ET COMPAGNIE, Paris (FR)

(72) Inventor: Florent Picavet, Marcq en Baroeul (FR)

(73) Assignee: LESAFFRE ET COMPAGNIE, Paris (FR)

( * ) Notice: Subject to any disclaimer, the term of this patent is extended or adjusted under 35 U.S.C. 154(b) by 0 days.

(21) Appl. No.: 14/904,990

(22) PCT Filed: Jul. 22, 2014

(86) PCT No.: PCT/FR2014/051894
§ 371 (c)(1),
(2) Date: Jan. 14, 2016

(87) PCT Pub. No.: WO2015/011403
PCT Pub. Date: Jan. 29, 2015

(65) Prior Publication Data
US 2016/0157499 A1    Jun. 9, 2016

(30) Foreign Application Priority Data

Jul. 24, 2013 (FR) ...................... 13 57311

(51) Int. Cl.
*A21C 1/14* (2006.01)
*A21D 8/04* (2006.01)
(Continued)

(52) U.S. Cl.
CPC .......... *A21C 1/1435* (2013.01); *A21C 1/1425* (2013.01); *A21D 8/047* (2013.01);
(Continued)

(58) Field of Classification Search
CPC .... A21C 1/1425; A21C 1/1435; A21D 8/047; B67D 7/02; B67D 7/08; B67D 7/16;
(Continued)

(56) References Cited

U.S. PATENT DOCUMENTS 1,957,081 A * 5/1934 Schneible ............. F25D 31/002
222/146.6
2,255,280 A   9/1941 Colvin
(Continued)

FOREIGN PATENT DOCUMENTS

CA    2 255 339 A1    6/2000
CN    202087213 U    12/2011
(Continued)

OTHER PUBLICATIONS

International Search Report of PCT/FR2014/051894 dated Jan. 22, 2015 [PCT/ISA/210].
(Continued)

*Primary Examiner* — J C Jacyna
(74) *Attorney, Agent, or Firm* — Sughrue Mion, PLLC

(57) ABSTRACT

The invention relates to a device for dispensing liquid yeast in a bakery, including: an inner panel (2) of a refrigerated chamber (6) onto which an inner circuit (20) for the flow of liquid yeast is pre-mounted, wherein said inner circuit is intended to be connected to a liquid yeast vessel (4) and includes a pumping unit (21); an outer panel (1) of a refrigerated chamber (6) onto which a liquid yeast metering device (16) and a metering table (10) are pre-mounted, wherein said metering table is intended to receive a vessel (3) to be filled with an amount of liquid yeast metered by said liquid yeast metering device (16). Said inner panel (2) and said outer panel (1) are structured such as to be attached sandwiched onto the wall (5) of a refrigerated chamber (6) for containing said vessel (4). Said liquid yeast metering
(Continued)

device (16) is intended to be connected, through a wall (5) of the refrigerated chamber (6), to said inner circuit (20).

27 Claims, 9 Drawing Sheets

(51) Int. Cl.
  *B67D 7/02*  (2010.01)
  *B67D 7/08*  (2010.01)
  *B67D 7/16*  (2010.01)
  *B67D 7/80*  (2010.01)

(52) U.S. Cl.
  CPC ............... *B67D 7/02* (2013.01); *B67D 7/08* (2013.01); *B67D 7/16* (2013.01); *B67D 7/80* (2013.01); *B67D 2210/00013* (2013.01); *B67D 2210/00031* (2013.01); *B67D 2210/00057* (2013.01)

(58) Field of Classification Search
  CPC ........... B67D 7/80; B67D 2210/00013; B67D 2210/00031; B67D 2210/00057
  USPC .......... 222/146.6, 148; 62/389, 391; 141/89, 141/91, 83
  See application file for complete search history.

(56) References Cited

U.S. PATENT DOCUMENTS

| | | | | |
|---|---|---|---|---|
| 2,630,259 A | * | 3/1953 | Stein | F25D 31/002 137/170.3 |
| 2,646,667 A | * | 7/1953 | Kromer | F25D 31/002 62/227 |
| 6,516,625 B2 | | 2/2003 | Bedard | |
| 8,186,545 B2 | * | 5/2012 | Blomme | B67D 3/0025 222/180 |
| 2006/0168986 A1 | * | 8/2006 | Saitoh | B67D 1/0031 62/390 |
| 2007/0157656 A1 | * | 7/2007 | Hall, Sr. | B67D 1/0867 62/389 |
| 2008/0302824 A1 | | 12/2008 | Blomme | |
| 2011/0100504 A1 | * | 5/2011 | Saranow | A45D 19/00 141/83 |
| 2012/0067076 A1 | | 3/2012 | Schroeder et al. | |
| 2013/0126556 A1 | * | 5/2013 | Riester | B65D 83/06 222/135 |
| 2013/0220480 A1 | * | 8/2013 | Angus | B67D 7/302 141/9 |

FOREIGN PATENT DOCUMENTS

| | | | | |
|---|---|---|---|---|
| DE | | 3332236 A1 | 3/1985 | |
| DE | 10 2009 047 245 A1 | | 6/2011 | |
| EP | | 0 792 930 A1 | 9/1997 | |
| WO | | 02/30807 A1 | 4/2002 | |
| WO | WO2014/183185 | * | 11/2014 | ............... B67D 1/08 |

OTHER PUBLICATIONS

Chinese Office Action for counterpart Application No. 201480041170.2 dated Feb. 1, 2019 by the State Intellectual Property Office of People's Republic of China; 20 pages (including translation).

\* cited by examiner

Weekly wash

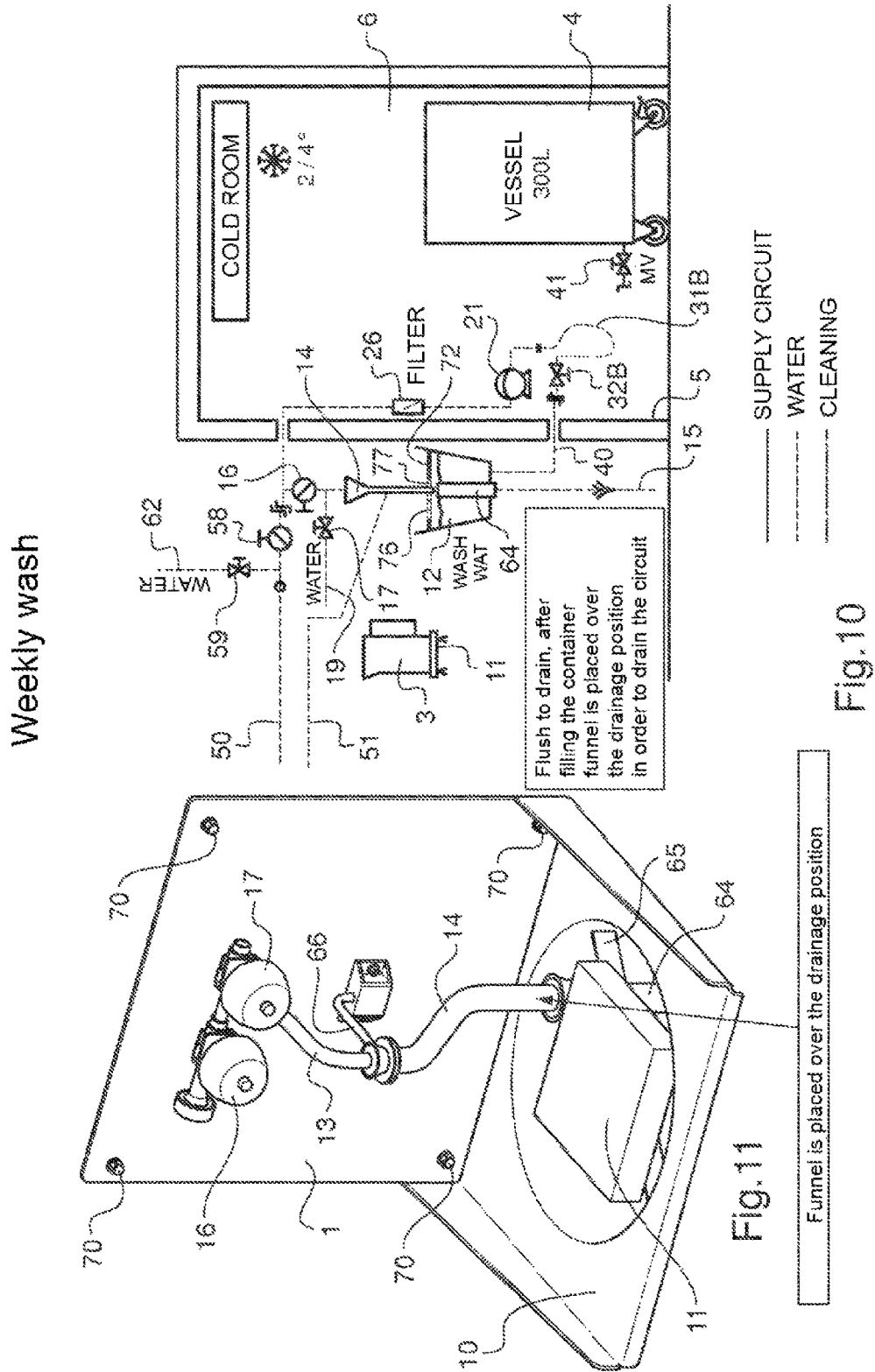

DEVICE FOR DISPENSING YEAST IN A BAKERY AND SYSTEM FOR DISPENSING YEAST IN A BAKERY

CROSS REFERENCE TO RELATED APPLICATIONS

This application is a National Stage of International Application No. PCT/FR2014/051894, filed Jul. 22, 2014, claiming priority based on French Patent Application No. 13 57311, filed Jul. 24, 2013, the contents of all of which are incorporated herein by reference in their entirety.

FIELD OF THE INVENTION

The invention relates to devices for dispensing yeast in a bakery and associated systems for dispensing yeast in a bakery.

BACKGROUND OF THE INVENTION

In the prior art, it is known to perform an on-site installation of all components of a device for dispensing yeast, within the existing yeast dispensing system in the bakery of the client. The bakery usually already has a cold room in which the elements of the yeast dispensing device will have to be installed on site. This "in situ" installation can be completely adapted to the existing bakery layout, in particular the existing layout of the cold room. However, such on-site installation can be relatively expensive. In particular, for relatively small bakeries, typically corresponding to a limited weekly consumption of yeast such as less than 1000 liters of yeast per week, the cost of on-site installation can be considered too high.

One can consider obtaining a complete cold room which already integrates all the necessary components, to reduce costs. However, such a device would duplicate the cold room which often already exists in the bakery. In addition, such an integrated cold room might be too small to house anything other than the vessel of liquid yeast.

SUMMARY OF THE INVENTION

The object of the present invention is to provide a device for dispensing yeast and an associated system for dispensing yeast which at least partially overcome the aforementioned disadvantages.

More particularly, the invention aims to provide a device for dispensing yeast and an associated system for dispensing yeast which, by using the existing cold room already in place in the bakery, requires an additional installation cost which is lower than in the prior art. To do so, the invention proposes panels internal and external to the cold room, on which some or all of the necessary components are already pre-mounted, so that one only needs to attach these panels to either side of a wall of the cold room, reducing or minimizing the assembly operations performed on site during installation.

To this end, the invention relates to a device for dispensing liquid yeast in a bakery, comprising: an inner panel of a refrigerated chamber, onto which is pre-mounted an inner circuit for the flow of liquid yeast which is intended to be connected to a liquid yeast vessel and which comprises a pumping unit; an outer panel of the refrigerated chamber, onto which are pre-mounted a liquid yeast metering device and a metering table which is intended for receiving a container to be filled with an amount of liquid yeast metered by said liquid yeast metering device; said inner panel and said outer panel being structured so as to be attached sandwiched onto the wall of a refrigerated chamber intended to contain said vessel; said liquid yeast metering device being intended to be connected, through a wall of the refrigerated chamber, to said inner circuit.

To this end, the invention also provides a system for dispensing liquid yeast in a bakery, comprising: a refrigerated chamber; a liquid yeast vessel located within said refrigerated chamber; a device for dispensing liquid yeast in a bakery according to any one of the preceding claims, which is mounted so as to sandwich a wall of said refrigerated chamber and which is connected to said vessel so as to be able to pump liquid yeast from said vessel.

According to preferred embodiments, the invention comprises one or more of the following features that may be used separately or may be partially or fully combined.

Preferably, the device for dispensing yeast further comprises a cleaning tank pre-mounted on said outer panel and located under said metering table, and a wash water metering device pre-mounted on said outer panel, intended for supplying said cleaning tank and intended to be connected to a wash water inlet. The presence of the cleaning tank provides a point of entry for introducing detergent into the cleaning circuit while preventing yeast from spilling onto the ground, with or without recirculation of the wash water. The cleaning tank also serves as a vessel which can hold a varying volume of wash water, in other words a vessel in the cleaning circuit, with or without recirculation of the wash water.

Preferably, the device for dispensing liquid yeast comprises, downstream of said wash water metering device, a wash water outlet which can be manually directed either toward said tank or toward an internal drainage pipe that is not in communication with the bottom of said tank. Thus, switching between the cleaning circuit with recirculation and the cleaning circuit without recirculation can be carried out very simply, manually and mechanically, therefore with a risk of failure that is virtually nonexistent.

Preferably, said tank has an outlet to a wash water recirculation circuit and said tank is ring-shaped, preferably cylindrical, arranged around said internal drainage pipe. This corresponds to a particularly compact embodiment for switching between the cleaning circuit with recirculation and the cleaning circuit without recirculation. This particularly compact embodiment renders it particularly suitable for pre-mounting on the outer panel.

Preferably, said wash water outlet has a pivotable part, preferably with at least two bends. This represents a particularly simple structural embodiment, allowing a simple pivot to switch from the cleaning circuit with recirculation position to the cleaning circuit without recirculation position.

Preferably, said liquid yeast metering device and said wash water metering device are connected to a common outlet. This corresponds to a particularly compact embodiment of the outlets of the metering devices. This particularly compact design makes it particularly suitable for pre-mounting on the outer panel.

Preferably, no welding is carried out during installation of the panels on the wall of the refrigerated chamber. Thus, during on-site installation of the inner and outer panels, there is no need for a highly skilled installer such as a welder; the presence of a normally qualified installer is sufficient, which makes the use of pre-mounted inner and outer panels all the more attractive and inexpensive.

Preferably, said liquid yeast metering device is automatic and is associated with a weighing system which is integrated with said metering table. This fully automated system is of interest as it does not require complicated on-site installation, since it also can be pre-mounted on the outer panel.

Preferably, a liquid yeast flowmeter is pre-mounted on the inner panel, said inner circuit comprising a branch line connected to said flowmeter. This liquid yeast flowmeter allows remote dispensing of liquid yeast into a kneading machine physically distanced from the cold room, which is of interest as it does not require complicated on-site installation, since it also can be pre-mounted on the inner panel.

Preferably, said inner circuit comprises another branch line intended to pass through a wall of the refrigerated chamber. Preferably, said inner circuit also comprises a water hookup pre-mounted on the inner panel, intended to be connected to a water inlet. Preferably, said inner circuit comprises a yeast filter located downstream of the pumping unit. These aforementioned elements enable a fuller and richer use of the device for dispensing liquid yeast, which is of interest as it does not require complicated on-site installation, since it also can be pre-mounted on the inner panel.

Preferably, all pipe and hose connections are pre-mounted on the inner panel. Thus, they are hidden within the cold room and are not in contact with the outside where they could more easily become soiled or damaged. Preferably, one or more valves are pre-mounted on the inner panel. The inner panel, with many elements pre-mounted on it, is particularly advantageous in terms of simplicity and ease of installation, despite the number and complexity of the elements it incorporates.

Preferably, the mounting of said device for dispensing liquid yeast is self-supporting by the pressure of the inner and outer panels against said wall of the refrigerated chamber: it is in a sandwich type of assembly. While the installation remains simple and easy, because it does not require on-site installation of elements to support the inner and outer panels on the wall of the cold room, it is thus still rather robust.

Preferably, said vessel is independently movable relative to said refrigerated chamber. This ensures the easy replenishment of liquid yeast over time, and it requires no other arrangement within the cold room aside from the placement of the inner and outer panels.

Preferably, the capacity of said liquid yeast vessel is between 100 liters and 1000 liters, preferably between 100 liters and 600 liters or between 300 liters and 1000 liters, more preferably between 300 liters and 600 liters. The device for dispensing liquid yeast and the associated system for dispensing liquid yeast present an optimal compromise between efficiency and cost of manufacture and installation, for this type of intermediate capacity corresponding to a moderately sized bakery. In contrast, on-site installation of more elements allows better optimization for larger bakeries.

Preferably, said system is a remote dispensing system comprising a liquid yeast flowmeter pre-mounted on said inner panel and a pipe at least several meters in length, preferably greater than 10 meters, extending downstream of the flowmeter. This remote dispensing capability remains compatible with the simplified installation of a device essentially comprising two panels, inner and outer, with most components pre-mounted on the panels.

Preferably, the system for dispensing liquid yeast further comprises a slave cabinet for setting the yeast amount setpoint, connected to a master cabinet for setting the yeast amount setpoint located on the same wall as said outer panel. The compactness of the pre-mounted outer panel facilitates the addition, on the same cold room wall, of this additional component which is not pre-mounted.

Preferably, the system for dispensing liquid yeast further comprises a recirculation connection which is connected on the outer panel side to said outlet of said cleaning tank and which is intermittently connected on the inner panel side to the pumping unit. Thus, the cleaning circuit with wash water recirculation can easily be implemented in spite of a pumping unit being located on the inner panel side inside the cold room.

Preferably, the liquid yeast is either a yeast starter or actual liquid yeast, preferably stabilized. Preferably, the temperature of said refrigerated chamber is regulated and is between 1° C. and 7° C., and preferably between 2° C. and 4° C.

Preferably, a method for installing a system for dispensing liquid yeast in a bakery according to the invention comprises a step in which the holes corresponding to connecting passages between the inner and outer panels, traversing a wall of the refrigerated chamber, are represented on a template of holes to be drilled in the wall of the refrigerated chamber, said template being attached to said wall of the refrigerated chamber to guide the drilling of said holes. On-site assembly is thus easier and faster.

Preferably, the metering device is a valve, manual or automatic, or a faucet, manual or automatic.

The device for dispensing liquid yeast and the associated system for dispensing liquid yeast may advantageously be implemented as a basic module to which can be added one or more options.

The basic module preferably comprises: the inner panel of the refrigerated chamber on which is pre-mounted an inner circuit for the circulation of liquid yeast, which is intended to be connected to a liquid yeast vessel and which comprises a pumping unit; and the outer panel of the refrigerated chamber, on which are pre-mounted a device for dispensing liquid yeast and a metering table intended for receiving a container to be filled with a quantity of liquid yeast metered by the liquid yeast metering device. The inner panel and outer panel are structured so as to be attached sandwiched onto the wall of a refrigerated chamber intended to contain said vessel. The liquid yeast metering device is intended to be connected, through a wall of the refrigerated chamber, to said inner circuit. The inner panel of the basic module preferably also comprises a pre-mounted yeast filter, situated downstream of the pumping unit and integrated into the inner circuit. The outer panel of the basic module preferably also comprises a cleaning tank pre-mounted and located beneath the metering table. The outer panel of the basic module preferably also comprises a pre-mounted wash water metering device, intended for supplying the cleaning tank and for connection to a wash water inlet. In addition to these components pre-mounted on the inner and outer panels, in the basic module there may preferably be added a flexible hose for connecting to the liquid yeast vessel and a connection to the site water supply system and a connection to the site water drainage system.

To this basic module, there may be added a first manual or automatic weight-based metering option, comprising a weighing system which is added to the metering table and which can advantageously involve simply placing a scale on the metering table, and which will be associated with the liquid yeast metering device of the basic module.

To this basic module there may be added a second option of direct metering in the kneading machine without water flushing, incorporating additional piping and a flowmeter.

To this basic module there may be added a third option of direct metering in the kneading machine with water flushing, integrating additional piping and a flowmeter.

In systems providing direct metering in the kneading machine, the flowmeter may be placed right next to the kneading machine.

Other features and advantages of the invention will be apparent from the following description of a preferred embodiment of the invention, given by way of example and with reference to the accompanying drawings.

BRIEF DESCRIPTION OF DRAWINGS

FIGS. 10 and 11 schematically represent portions and details of the system represented in FIG. 7, but in a weekly wash configuration of the system with drainage of the wash water.

DETAILED DESCRIPTION OF THE INVENTION

The scale of FIGS. 1, 2, 9, and 11 is preferably a scale of 1:10. The refrigerated chamber is either a cold room or a refrigerator.

Figure 1:
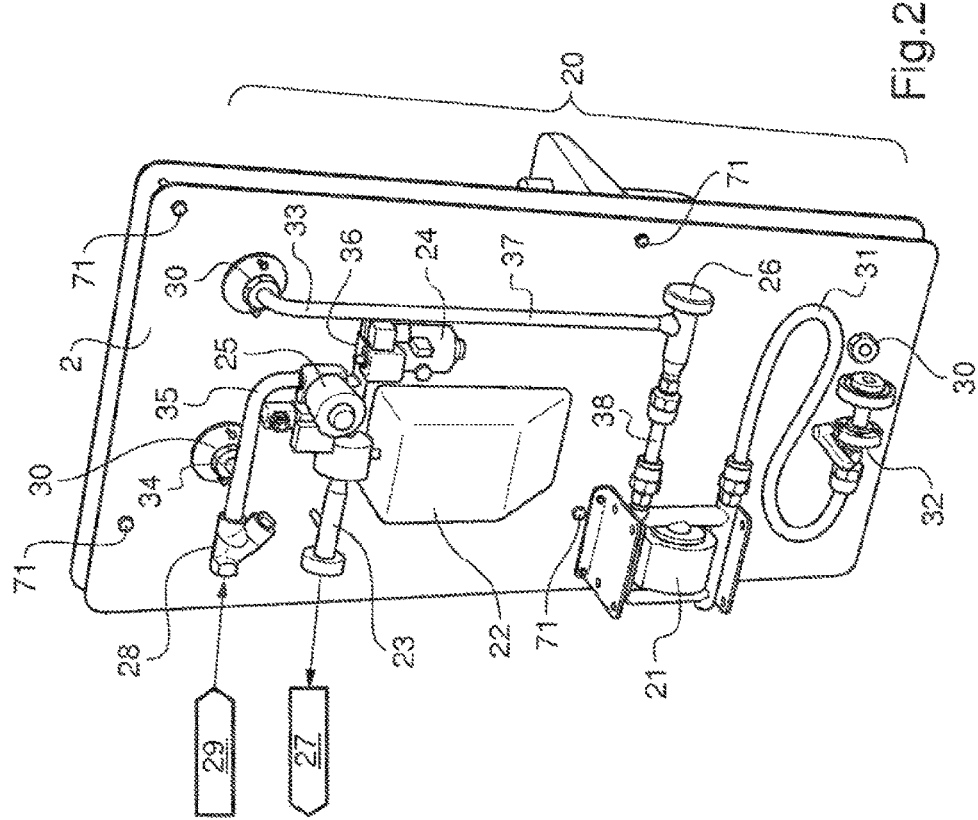
FIG. 1 schematically represents an example of an outer panel of a device for dispensing liquid yeast in a bakery according to an embodiment of the invention.

FIG. 1 schematically represents an example of an outer panel of a device for dispensing liquid yeast in a bakery according to an embodiment of the invention. The outer panel 1 is secured to the cold room wall with long screws 70 passing through the cold room wall, for example four long screws 70. The outer panel 1 is preferably of metal, advantageously of stainless steel. Multiple components are pre-mounted on this outer panel 1. A metering table 10 is attached substantially orthogonal to the plane of the outer panel 1. This metering table 10 supports a cleaning tank 12 which has a water drainage outlet 15 underneath. Preferably, the metering table 10 integrates a weighing system 11, but this is not mandatory. The weighing system 11 is located on top of the metering table 10. The cleaning tank 12 is closed by a cover 72 when it is not in use. The cover 72 supports the metering table 10 on which is placed a pitcher 3. The pitcher 3 is completely autonomous from the metering table 10. On the outer panel 1, there is a liquid yeast inlet 18 and a wash water inlet 19. An automated metering valve 16 for measuring liquid yeast is arranged downstream of the liquid yeast inlet 18. A manual metering valve 17 for measuring wash water is arranged downstream of the wash water inlet 19.

A common outlet 13 for the liquid yeast metering valve 16 and the wash water metering valve 17 therefore acts as both the liquid yeast outlet 13 and wash water outlet 13. This common outlet 13 comprises a pivotable part 14 which is pivotable around the ring 73 and which has dual bends, so as to have the following general form, from top to bottom: an upper vertical portion, a horizontal portion, a lower vertical portion. The ring 73 makes it possible to unscrew the pivotable part 14 which is removable and can thus be detached from the rest of the common outlet 13. The lower vertical portion of the pivotable part 14 of the common outlet 13 is immersed in the pitcher 3. In reality, this pivotable part 14 is removable and is not used when filling the pitcher 3 with liquid yeast; this pivotable part 14 is used when cleaning the system for dispensing liquid yeast. When the pivotable part 14 is not in use, it can be stored against the outer panel 1, on hooks 74.

Figure 2:
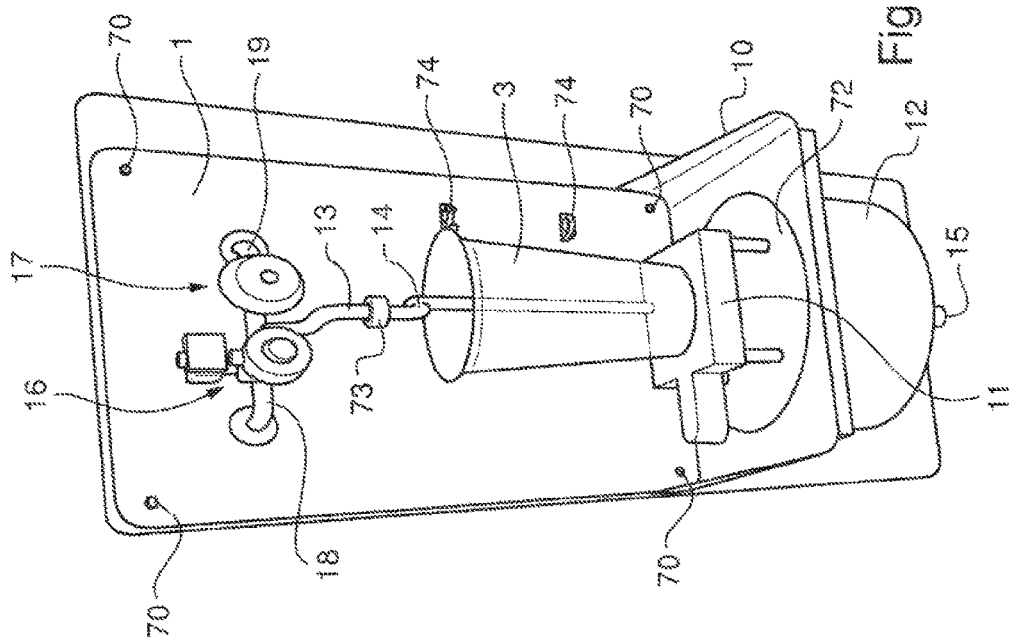
FIG. 2 schematically represents an example of an inner panel of a device for dispensing liquid yeast in a bakery according to an embodiment of the invention.

FIG. 2 schematically represents an example of an inner panel of a device for dispensing liquid yeast in a bakery according to an embodiment of the invention. The inner panel 2 is secured to the cold room wall using nuts 71 screwed onto the long screws 70 passing through the cold room wall, for example in a sandwiched assembly such as that shown in FIG. 12. The inner panel 2 is preferably made of stainless steel. On the inner panel 2, there are pre-mounted several components that are part of an inner circuit 20 for the flow of liquid yeast, intended to be connected to a liquid yeast vessel to supply liquid yeast. To ensure the fluidtightness of the connections through the cold room wall to which the inner 2 and outer 1 panel are attached, connectors 30 are pre-assembled, preferably all on the inner panel 2 and none on the outer panel 1. A pumping unit 21 is attached to the inner panel 2. Upstream of the pumping unit 21, relative to the direction of flow of the liquid yeast, a flexible hose is arranged which terminates at a manual butterfly valve 32 intended to be connected to a liquid yeast vessel.

Downstream of the pumping unit 21, relative to the direction of flow of the liquid yeast, a coupling 38 is attached, then a liquid yeast filter 26 to filter the flow of liquid yeast, then a connection 37 which leads to a branch. From this branch, one leg continues in the form of a connection 33 which then traverses the cold room wall and leads to the outer panel 1 side, whereas on the other leg there is an automatic valve 36. An inlet 29 to admit water after it passes through a filter 28, divides into two legs, one of which continues in the form of a connection 34 which then traverses the cold room wall and lead to the outer panel 1 side, and the other of which is extended by a connection 35 on which an automatic valve 25 is located. Downstream of the automatic valve 25 there is an attached flowmeter 22, followed by a connection 23 leading to an outlet 27 intended for connection to external piping leading to the kneading machine, in order to allow remote dispensing of liquid yeast directly into the kneading machine at a distance from the cold room.

Figure 3:
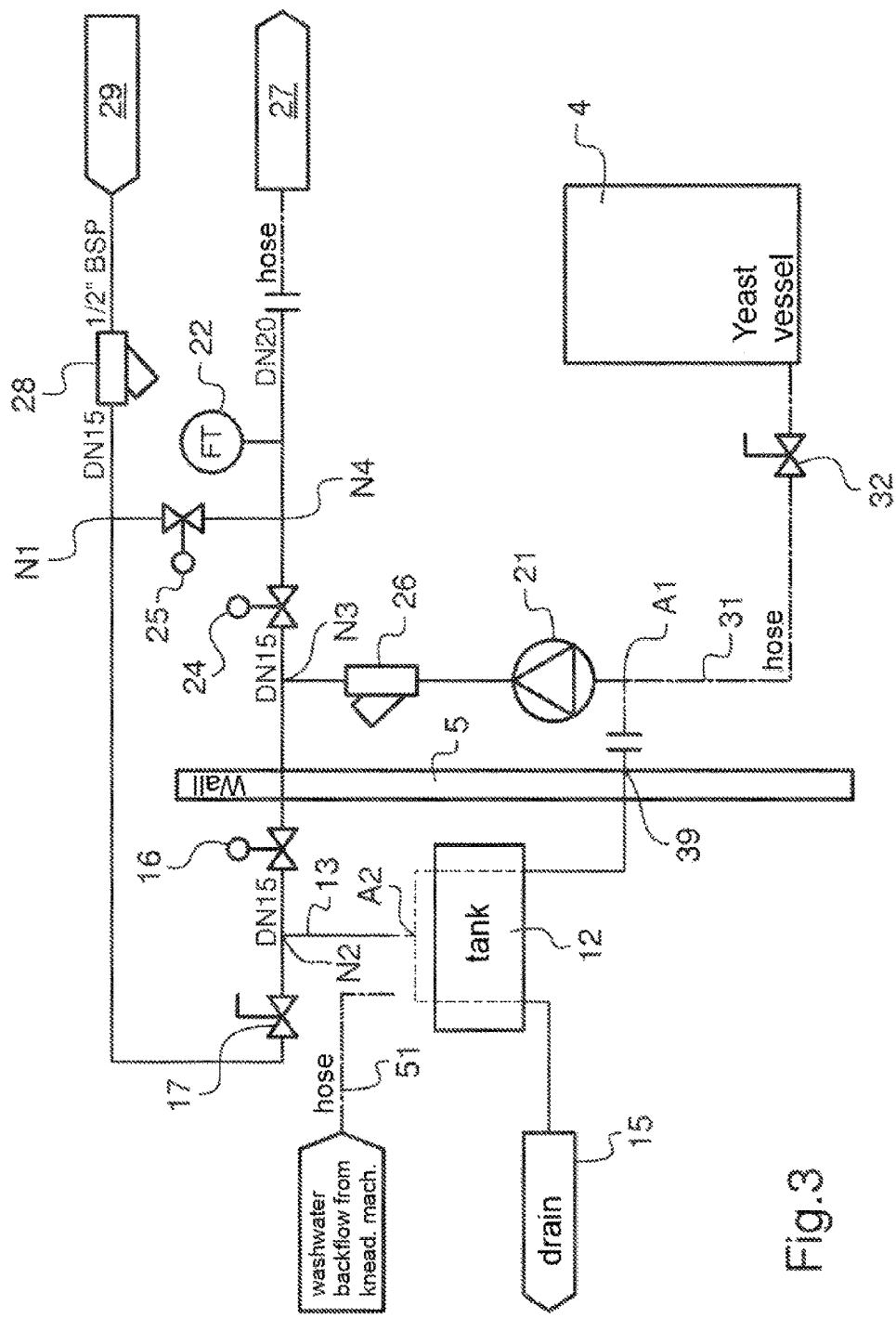
FIG. 3 schematically represents an example connection between the various components of the inner and outer panels of a device for dispensing liquid yeast in a bakery according to an embodiment of the invention.

FIG. 3 schematically represents an example connection between the various components of the inner and outer panels of a device for dispensing liquid yeast in a bakery according to an embodiment of the invention. The general circuit for the flow of liquid yeast and/or water, comprises several nodes N1 to N4, corresponding to branch lines, and switches A1 to A2, corresponding to different connection possibilities. The inlets from the outside are the liquid yeast vessel 4, the water inlet 29, the wash water backflow from the remote kneading machine connected to a hose 51. This hose 51 allows liquid to flow through it into the cleaning tank 12 which also serves as vessel to hold a varying volume in the water flow circuit. Outlets to the outside are the outlet 27 to the kneading machine and the drainage outlet 15 for dirty wash water.

The water filter 28 is between the water inlet 29 and node 1. Between node N1 and node N2 is a manual valve 17. Between node N2 and node N3 there are, in succession, an automatic valve 17 and the traversal of the cold room wall 5. Between node N3 and node N4 is an automatic valve 24. Between node N4 and outlet 27 is the flowmeter 22. Between node N1 and node N4 is an automatic valve 25. When manual valve 32 is connected to the vessel 4 of liquid yeast, between the vessel 4 of liquid yeast and node N3 there are, in succession, the hose 31, the pumping unit 21, and the liquid yeast filter 26. When the manual valve 32 is connected to the recirculation connection 39, between node N2 and node N3 there are, in succession, outlet 13, cleaning tank 12, recirculation connection 39, hose 31, pumping unit 21, and liquid yeast filter 26. When the cleaning is coming to an end, the dirty wash water can be drained by connecting outlet 13 to the drainage outlet 15 instead of connecting it to the recirculation outlet 39.

Figure 4:
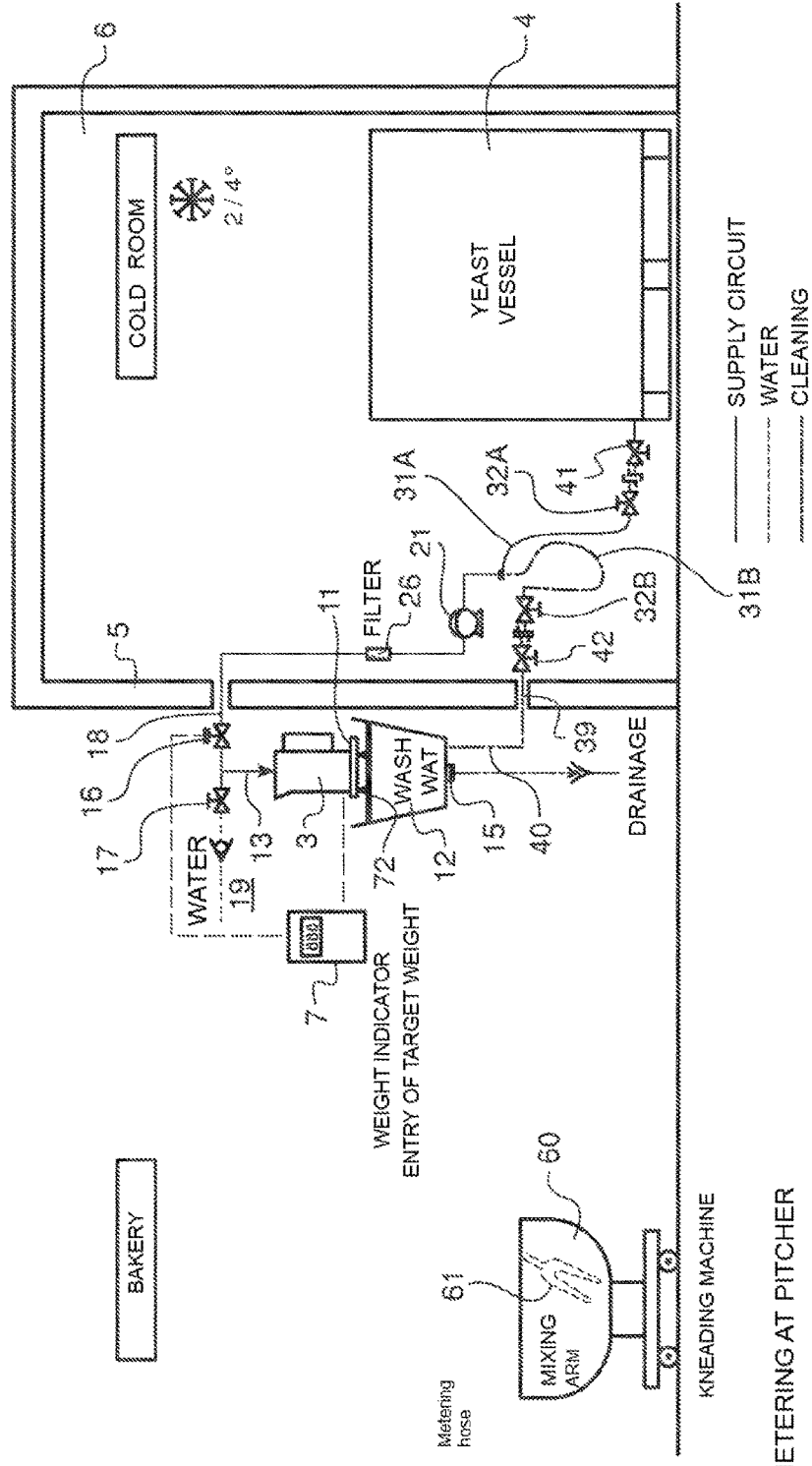
FIG. 4 schematically represents an example of a system for dispensing liquid yeast in a bakery according to an embodiment of the invention, corresponding to a system of metering at the vessel.

FIG. 4 schematically represents an example of a system for dispensing liquid yeast according to an embodiment of the invention corresponding to a metering system at the pitcher. The vessel 4 of liquid yeast is placed in the cold room 6 on the wall 5 to which are attached the inner and outer panels (not shown here for simplicity). The vessel 4 is a container resting on a pallet, and therefore is removable from the cold room 6 and can be transported by a forklift. A movable wheeled kneading machine 60, comprising a mixing arm 61, will be supplied with liquid yeast by the pitcher 3 which will be filled with liquid yeast when it is placed on the metering table 10. A master cabinet 7 for specifying yeast amount setpoints is located on the same wall and on the same side of the wall as the outer panel 1. The setpoint master cabinet 7 is not pre-mounted on the outer panel 1. The user, meaning the baker, specifies a setpoint for the amount of liquid yeast using a man-machine interface of the master cabinet 7, for example by means of a keyboard and screen assembly.

In FIG. 4, two alternative configurations are actually represented. A first configuration represents the flow of liquid yeast in the liquid yeast circuit, corresponding to connection positions 31A and 32A for the hose 31 and manual valve 32 respectively. A second configuration represents the flow of wash water in the wash water recirculation circuit, corresponding to connection positions 31B and 32B for the hose 31 and manual valve 32 respectively.

The circulation of liquid yeast in the liquid yeast circulation circuit is as follows. The liquid yeast advances in the liquid yeast circulation circuit mainly due to the pumping unit 21. Liquid yeast exits the vessel 4, passes through an open manual valve 41, this manual valve 41 being closed when hose 31 is not connected to the vessel 4, then passes through valve 32A, flows through hose 31A, is drawn upstream and flows back downstream of the pumping unit 21, passes through the liquid yeast filter 26, through the wall 5 of the cold room 6, to reach the liquid yeast inlet 18. This liquid yeast passes through the liquid yeast metering valve 16, which is open until the liquid yeast setpoint is reached and closes once the liquid yeast setpoint is reached. The wash water metering valve 17 is closed. As a result, the liquid yeast pours out the common outlet 13 into the pitcher 3. The pivotable part 14 of the common outlet 13 is absent (configuration shown in FIG. 4). Once the liquid yeast metering valve 16 closed and the pitcher 3 filled with the amount of liquid yeast previously set by the user in the master cabinet 7, the liquid yeast metering operation is completed, and the user can go to the kneading machine 60 with his pitcher 3 filled with liquid yeast.

The circulation of wash water in the water circulation circuit is as follows. The liquid yeast advances in the liquid yeast circulation circuit mainly due to the pumping unit 21. The pivotable part 14 of the common outlet 13 is present, while the pitcher 3 has been removed along with the cover 72 (configuration not shown in FIG. 4). The pivotable part 14 of the common outlet 13 is directed towards the interior of the cleaning tank 12. Water arrives through the water inlet 19, passes through the wash water metering valve 17, which remains open until the wash water recirculation circuit is filled with water and which is then closed to allow water to run in a loop in the wash water recirculation circuit in order to allow the detergent to act for a sufficient period, for example about 20 minutes. This wash water pours into the cleaning tank 12, into which the detergent is also poured from the outside by the user at the beginning of the washing phase. Next, this wash water exits the cleaning tank 12 through its outlet 40, flows through the recirculation connection 39 which traverses the wall 5 of the cold room 6, traverses an open manual valve 42, this manual valve 42 being closed when hose 31 is not connected to it, passes through valve 32B, flows through hose 31B, is drawn from upstream and is discharged downstream of the pumping unit 21, passes through the filter 26, again traverses the wall 5 of the cold room 6, and passes through metering valve 16 which is open. The wash water metering valve 17 is closed. As a result, this wash water pours through the common outlet 13 back into the cleaning tank 12, and the cycle continues as long as the detergent contained in the flow of wash water can act to clean the entire water circulation circuit.

Once the detergent has acted for a sufficient period, the pivotable part 14 of the common outlet 13 is redirected to the drainage outlet 15, and the dirty wash water is discharged into the sewer. The washing phase is completed. Before the washing phase, there is a prewash phase using water only, in other words without the addition of detergent, and after the washing phase there is a rinsing phase with water only. The rinsing phase with water only and/or the prewash phase can be carried out without recirculation of the water, meaning with the wash water discharged as soon as it has completed one circuit.

Figure 5:
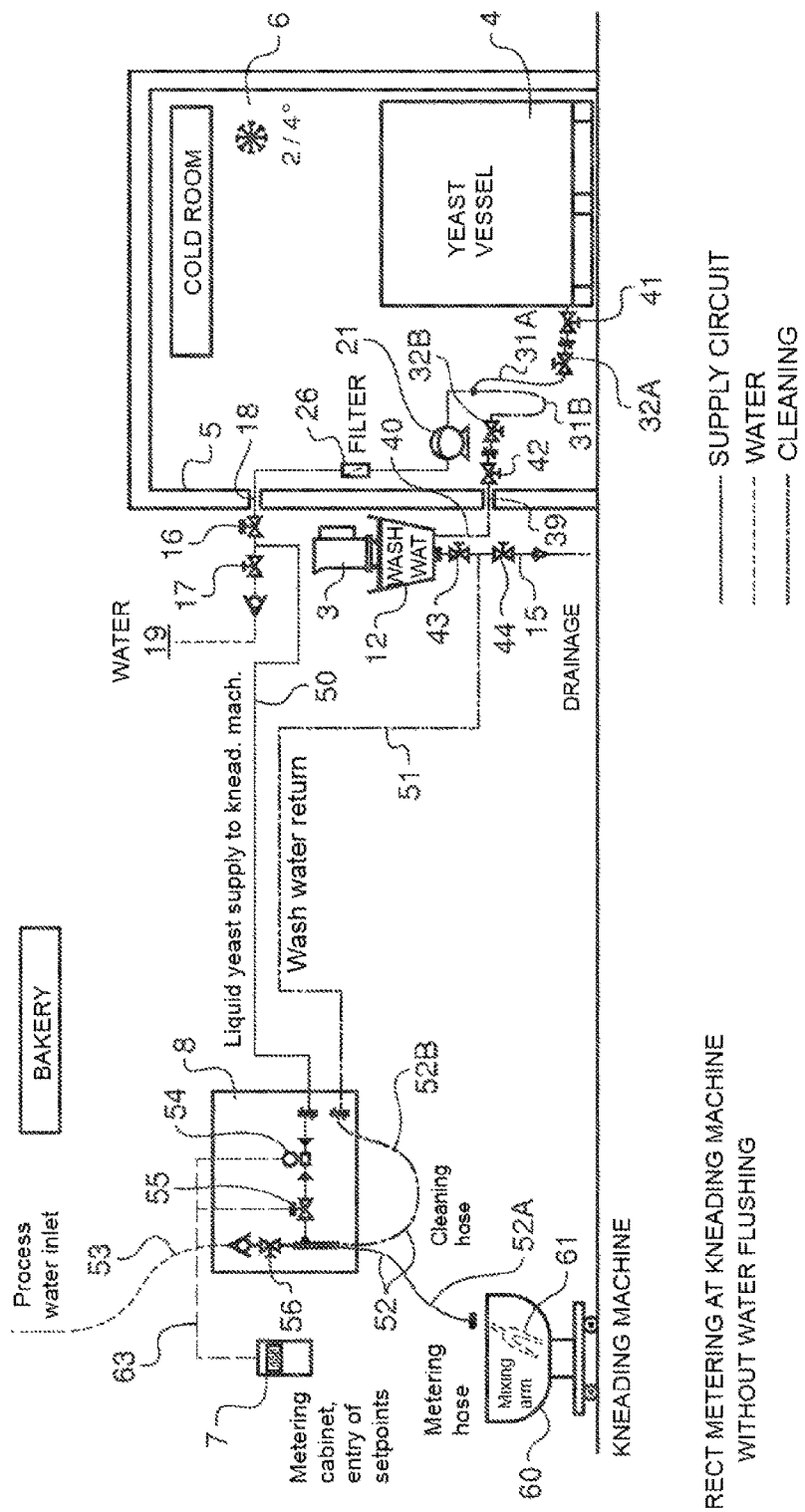
FIG. 5 schematically represents an example of a system for dispensing liquid yeast in a bakery according to an embodiment of the invention, corresponding to a direct metering system at the kneading machine, without water flushing.

FIG. 5 schematically represents an example of a system for dispensing liquid yeast in a bakery according to one embodiment of the invention, corresponding to a system of direct metering into the kneading machine without water flushing.

The circulation of liquid yeast in the liquid yeast circulation circuit takes place in a manner similar or identical to FIG. 4, until it reaches the liquid yeast metering valve 16. This liquid yeast travels through the liquid yeast metering valve 16, which is open. The liquid yeast metering valve 16 here allows metering into the pitcher in degraded mode, in particular when direct metering into the kneading machine has become impossible. The wash water metering valve 17 is closed. Instead of pouring through the common outlet 13 into a pitcher 3 as in FIG. 4, the liquid yeast travels into a pipe 50 which may be several meters long, possibly more than 10 meters and even up to 20 or 30 meters or more, and then flows through a flowmeter 54, and an automatic valve 55 which is open until the set amount of liquid yeast is reached and closes as soon as the set amount of liquid yeast is reached. A water inlet 53 is connected to a manual valve 56, open while the user fills the kneading machine 60 with the desired amount of water, into which is mixed the liquid yeast coming from the automatic valve 55. When the automatic valve 55 is open, the manual valve 56 should be closed. When the manual valve 56 is open, the automatic valve 55 should be closed. Both the liquid yeast from the automatic valve 55 and the water from the manual valve 56 will flow into the kneading machine 60 through hose 52, connected in its position 52A so as to lead to just above the kneading machine 60. Valves 55 and 56 and the flowmeter 54 are grouped in a panel 8 connected to or integrated into the master cabinet 7 which uses setpoints to control, via the electrical connection 63, both the flowmeter 54 and the valve 55. This cabinet is at a distance from the cool room 6.

The circulation of wash water in the water circuit is as follows. Water arrives through the water inlet 19, passes through the wash water metering valve 17, which remains open until the wash water recirculation circuit is full of water and is then closed so that the water can run in a loop in the wash water recirculation circuit in order to allow the detergent to act for a sufficient period, for example for about 20 minutes. Instead of pouring into the cleaning tank 12 through the common outlet as shown in FIG. 4, the wash water flows into a supply pipe 50 which may be several meters long, possibly more than 10 meters and even up to 20 or 30 meters or more, and then flows through a flowmeter 54, and an automatic valve 55 which is open. The manual valve 56 is closed. The wash water coming from the automatic valve 55 passes through hose 52, connected in its position 52B to a return pipe 51 which sends it back through an open valve 43, valve 44 being closed, to end in the cleaning tank 12, which serves as a vessel which can hold a varying volume, then flows out through the outlet 40 and continues to circulate in the water circuit in a manner identical or similar to FIG. 4, until it reaches the liquid yeast metering valve 16. This wash water passes through the liquid yeast metering valve 16, which is open, the wash water metering valve 17 being closed, and the cycle repeats.

Once the detergent has acted for a sufficient period, after passing through the return pipe 51, the wash water is redirected towards the drainage outlet 15 via an open valve 44, valve 43 then being closed, and the dirty wash water is discharged into the sewer. The washing phase is completed. Before the washing phase, there is a prewash phase using water only, in other words without the addition of detergent, and after the washing phase there is a rinsing phase with water only.

Figure 6:
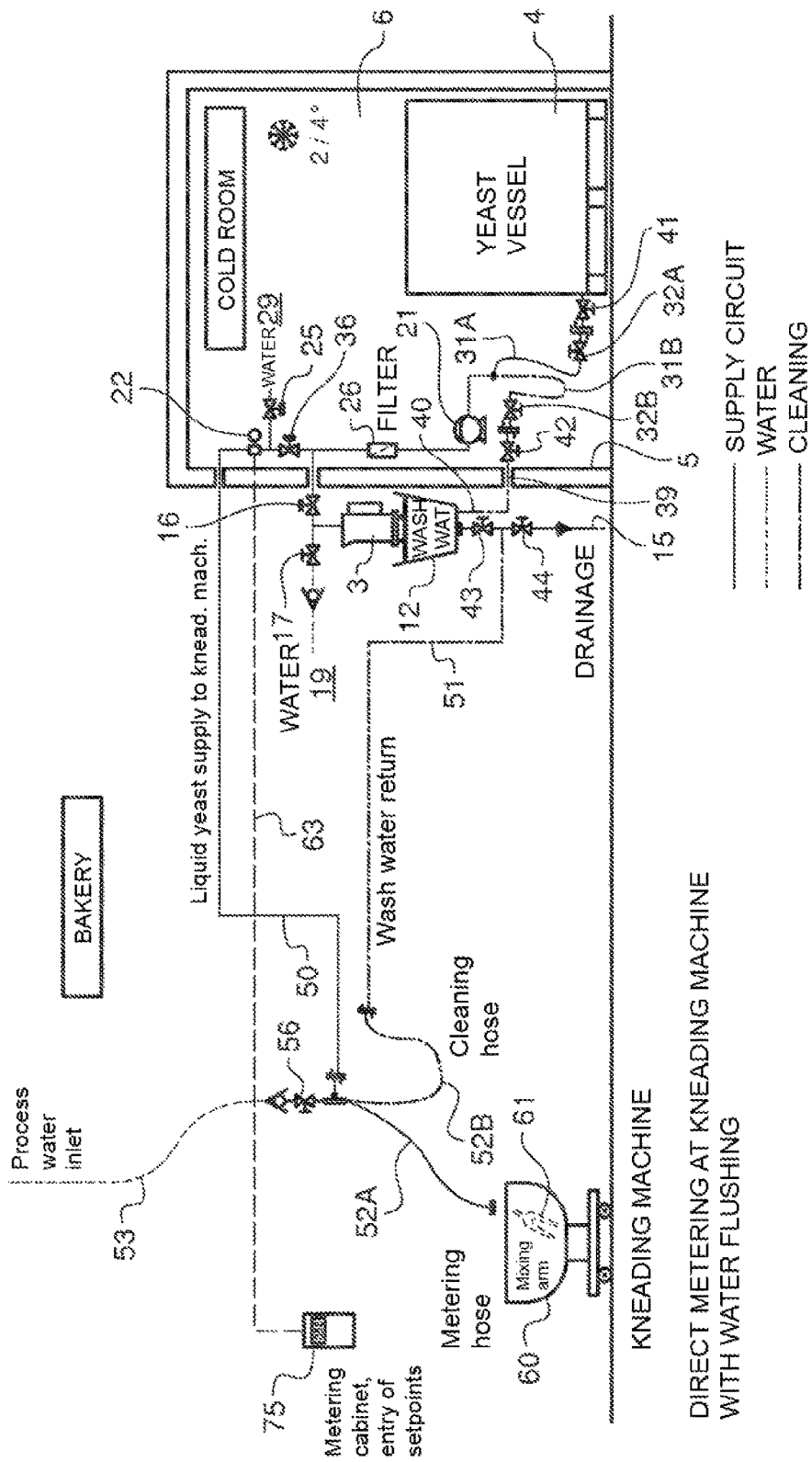
FIG. 6 schematically represents an example of a system for dispensing liquid yeast in a bakery according to an embodiment of the invention, corresponding to a direct metering system at the kneading machine, with water flushing.

FIG. 6 schematically represents an example of a system for dispensing liquid yeast in a bakery according to one embodiment of the invention, corresponding to a system of direct metering into the kneading machine with water flushing. Two modes of operation are possible for supplying the liquid yeast.

In a first mode, valve 36 is closed, and everything occurs in a manner identical or similar to FIG. 4, the liquid yeast flowing into the pitcher 3 through the liquid yeast metering valve 16 after passing through the liquid yeast filter 26.

In a second mode, the liquid yeast metering valve 16 is closed, and after passing through the liquid yeast filter 26, the liquid yeast flows through an automatic valve 36 which is open, the automatic valve 25 located downstream of water inlet 29 being closed, and then flows through a flowmeter 22. Automatic valve 36 remains open as long as the liquid yeast setpoint is not reached and closes as soon as the liquid yeast setpoint is reached. Next, this liquid yeast travels into a pipe 50 which may be several meters long, possibly more than 10 meters and even up to 30 meters or more. Once automatic valve 36 is closed, automatic valve 25 opens and water from water inlet 29 flushes the liquid yeast which is in the supply pipe 50. This water that flushes the liquid yeast will pour into the kneading machine 60, flushed by the next dose of liquid yeast which itself will be flushed by water into the next kneading machine 60.

A simultaneous operation with valves 16 and 36 open at the same time may also be considered.

A water inlet 53 is connected to a manual valve 56, open while the user fills the kneading machine 60 with the desired amount of water, into which is mixed the liquid yeast coming from the supply pipe 50. When automatic valve 36 is open, manual valve 56 should be closed. When manual valve 56 is open, automatic valve 36 is closed. Thus both the liquid yeast from automatic valve 36 and the water from manual valve 56 will flow into the kneading machine 60 through hose 52, connected in its position 52A so as to lead to just above the kneading machine 60. Valves 36 and 25 and flowmeter 22 are grouped on the inner panel 2 attached against the wall 5 of the cold room 6. A slave cabinet 75 sends a control setpoint, via the electrical connection 63, to both flowmeter 22 and valve 36. In a non-limiting example, about 2 liters of liquid yeast are mixed in the kneading machine 60 into about 40-50 liters of water in total. The water flushing is preferably carried out at a rate of 10 liters of liquid for 30 meters of pipe.

The circulation of wash water in the water circuit is as follows. Water comes from water inlet 19, passes through the open manual valve 17, joins the cleaning tank 12 and then flows out 40 to be drawn to the pumping unit 21, until the wash water recirculation circuit is full of water and is then closed to allow water to run in a loop in the wash water recirculation circuit in order to allow sufficient time for the detergent to act, for example about 20 minutes. At the outlet of the supply pipe 50, the wash water flows into hose 52 in connection position 52B, and the cleaning cycle continues in a manner identical or similar to that described in association with FIG. 5.

Figure 7:
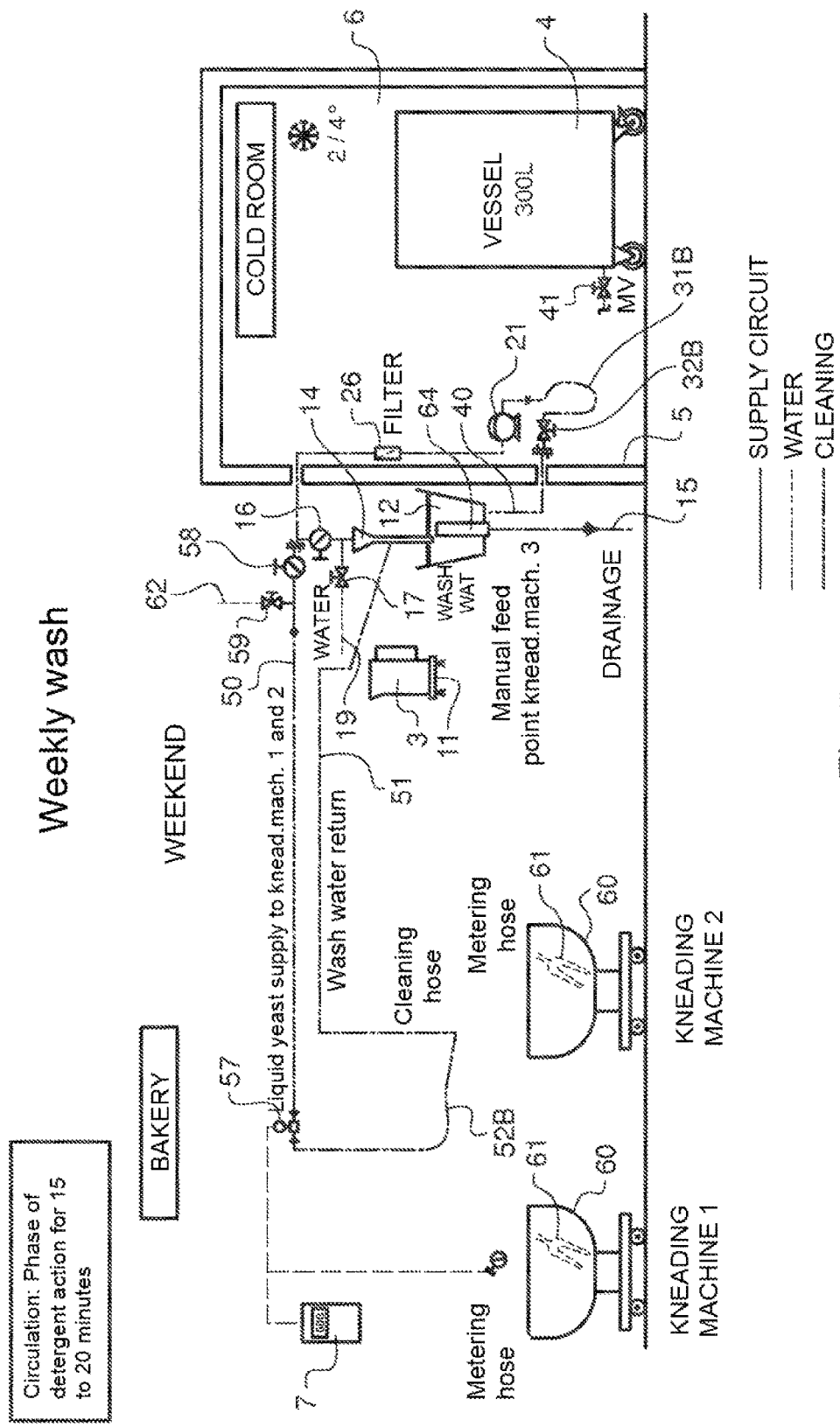
FIG. 7 schematically represents an example of a system for dispensing liquid yeast in a bakery according to an embodiment of the invention, in a weekly wash configuration of the system with recirculation of the wash water.

FIG. 7 schematically represents an example of a system for dispensing liquid yeast in a bakery according to an embodiment of the invention, in a weekly wash configuration of the system with recirculation of the wash water.

The weekly wash, corresponding to a prolonged shutdown of the system for dispensing liquid yeast, corresponds more specifically to a cleaning method which preferably comprises three steps. The first step is a pre-wash, in other words a washing of the entire liquid yeast dispensing circuit with water only, so as to empty the liquid yeast dispensing circuit of most of the liquid yeast remaining within. The second step is the actual wash, in other words washing the entire liquid yeast dispensing circuit with water and detergent. The detergent is advantageously added directly into the cleaning tank. In this second step, a first phase of 15 to 20 minutes is carried out with recirculation of the wash water containing the detergent, so that the detergent has plenty of time to act, followed by a second, shorter phase, which is carried out with drainage of the dirty wash water. The third step is a rinse, in other words a washing of the entire liquid yeast dispensing circuit with water only, in order to remove all remaining traces of detergent. Each of these cleaning phases will follow the next cycle, but although the washing phase generally involves recirculation in order to save water and detergent, the pre-washing and rinsing phases can be performed with an open circuit, in other words with the wash water discharged as soon as it has completed a loop.

The circulation of wash water in the water circuit occurs as follows. Water enters through water inlet 19, passes through open valve 17, joins the cleaning tank 12 and then exits it 40 to be drawn toward the pumping unit 21 until the wash water recirculation circuit is full of water, and is then closed so that the water runs in a loop in the wash water recirculation circuit in order to allow sufficient time for the detergent to act, for example about 20 minutes. At the outlet of the supply pipe 50, the wash water passes through a flowmeter 57 and travels into hose 52 in connection position 52B.

Next, the wash water flows through hose 52, connected in position 52B, to a return pipe 51 which rises to lead to the pivotable part 14 of the common outlet 13 directed towards the interior of the cleaning tank 12, which serves as a vessel of varying volume. This wash water will pour into the cleaning tank 12, into which the detergent is also poured from the outside by the user at the beginning of the washing phase, before exiting through the outlet 40 and continuing to circulate in the water circuit in a manner that is identical or similar to FIG. 4, until it travels back through the wall 5 of the cold room 6 toward the outer panel 1, and reaches valve 58, now open. This wash water flows through the open valve 58, valve 59 then being closed and the liquid yeast metering valve 16 also being closed, and the cycle continues until the detergent contained in the circulating wash water has cleaned the entire water circuit. The vessel 4 is disconnected from the inner circuit for the flow of liquid yeast, therefore manual valve 41 is closed.

Once the detergent has acted for a sufficient period, the pivotable part 14 of the common outlet 13 is redirected to the drainage outlet 15, and the dirty wash water is discharged into the sewer. The washing phase is completed. Before the washing phase, there is a prewash phase using water only, in other words without the addition of detergent, and after the washing phase, there is a rinsing phase with water only.

Figure 8:
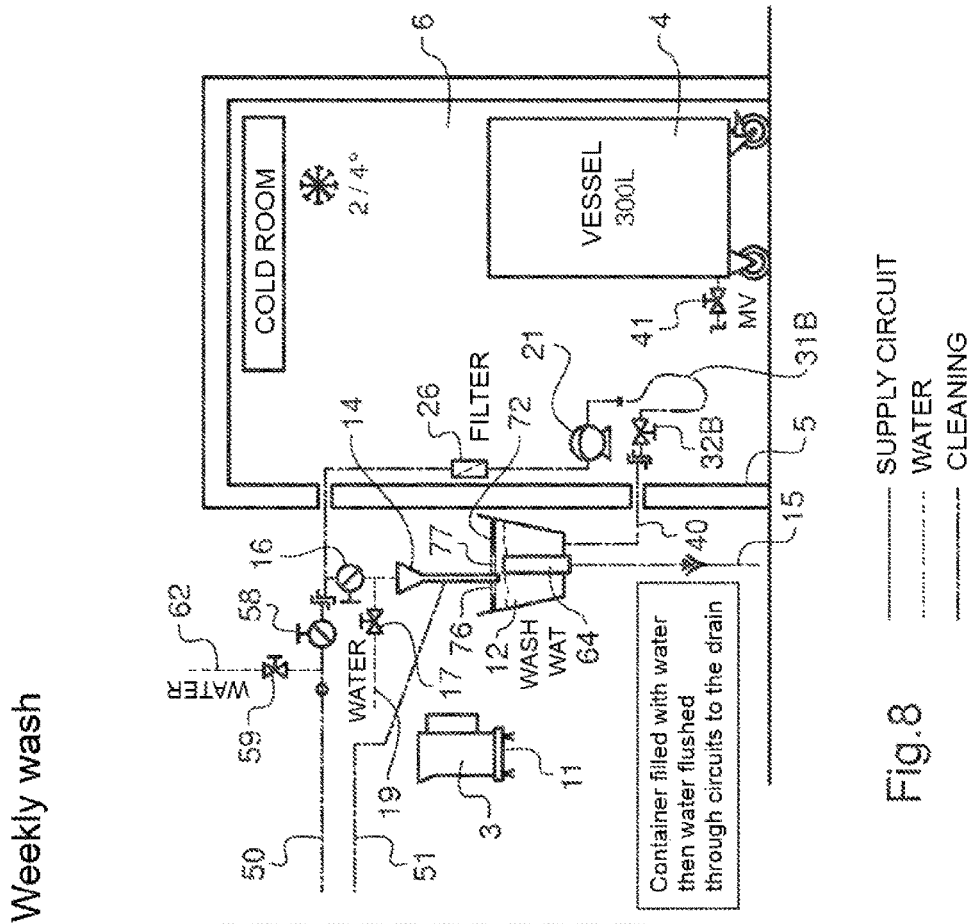
FIGS. 8 and 9 schematically represent portions and details of the system represented in FIG. 7.
Figure 9:
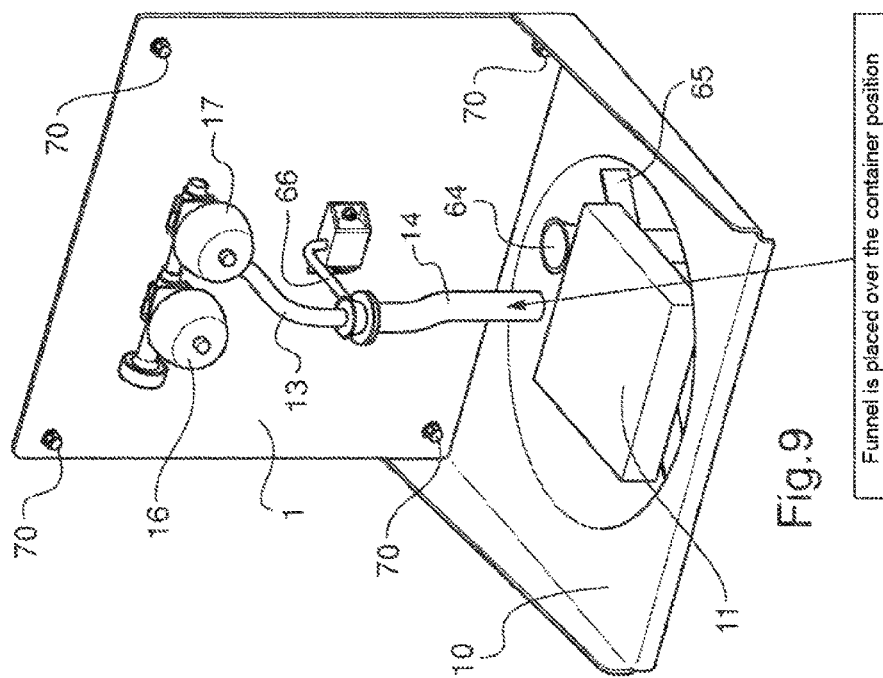

FIGS. 8 and 9 schematically represent portions and details of the system represented in FIG. 7. In FIG. 8, the cleaning tank 12 is cylindrical, and comprises an internal drainage tube 64. This internal drainage tube 64 is not in communication with the bottom of the cleaning tank 72 but opens directly into the drainage outlet 15. The cleaning tank 12 is covered by a cover 72. This cover 72 has two openings 76 and 77. Opening 76 is adapted to receive the bottom of the pivotable portion 14 so that the wash water can pour into the bottom of the cleaning tank 12, meaning when the wash water is flowing in recirculation mode, which corresponds to the arrangement in FIGS. 8 and 9 where the bottom of the pivotable part 14 is placed in opening 76. Opening 77 is adapted to receive the bottom of the pivotable part 14 so that the wash water can pour into the drainage tube 64 to be discharged through the drainage outlet 15, in other words when dirty wash water is being discharged.

In FIG. 9, in addition to the drainage tube 64, there is also represented an overflow outlet 65 that prevents the cleaning tank 12 from overflowing. A rod 66 has one of its ends attached to the outer panel 1, while its other end terminates in a support ring adapted to support the top of the pivotable part 14 which here is not screwed onto the end of the common outlet 13 by a ring, but is simply flared and arranged as a funnel under the common outlet 13. The rod 66 is hinged to pivot relative to the outer panel 1, so as to allow the pivotable part 14 to pivot. The metering table 10 is preferably a plate or a sheet of metal having flaps located between the wall 5 of the cold room 6 and the outer panel 1, such that the long screws 70 pass through these flaps before entering the interior of the cold room 6, where the nuts 71 are screwed on. Alternatively, the metering table 10 may have been previously welded onto the outer panel 1 before said panel is attached against the wall 5 of the cold room 6. The metering table 10 is then also pre-mounted on the outer panel 1. This welding is performed in the shop and not during on-site installation in the bakery.

FIGS. 10 and 11 schematically represent portions and details of the system represented in FIG. 7, but in a weekly wash configuration of the system with discharge of the wash water. Opening 77 is adapted to receive the bottom of the pivotable part 14 so that the wash water can flow into the drainage tube 64 before being discharged through the drainage outlet 15, meaning when the dirty wash water is being discharged, which corresponds to the arrangement of FIGS. 10 and 11 where the bottom of the pivotable part 14 is placed in opening 77.

Figure 12:
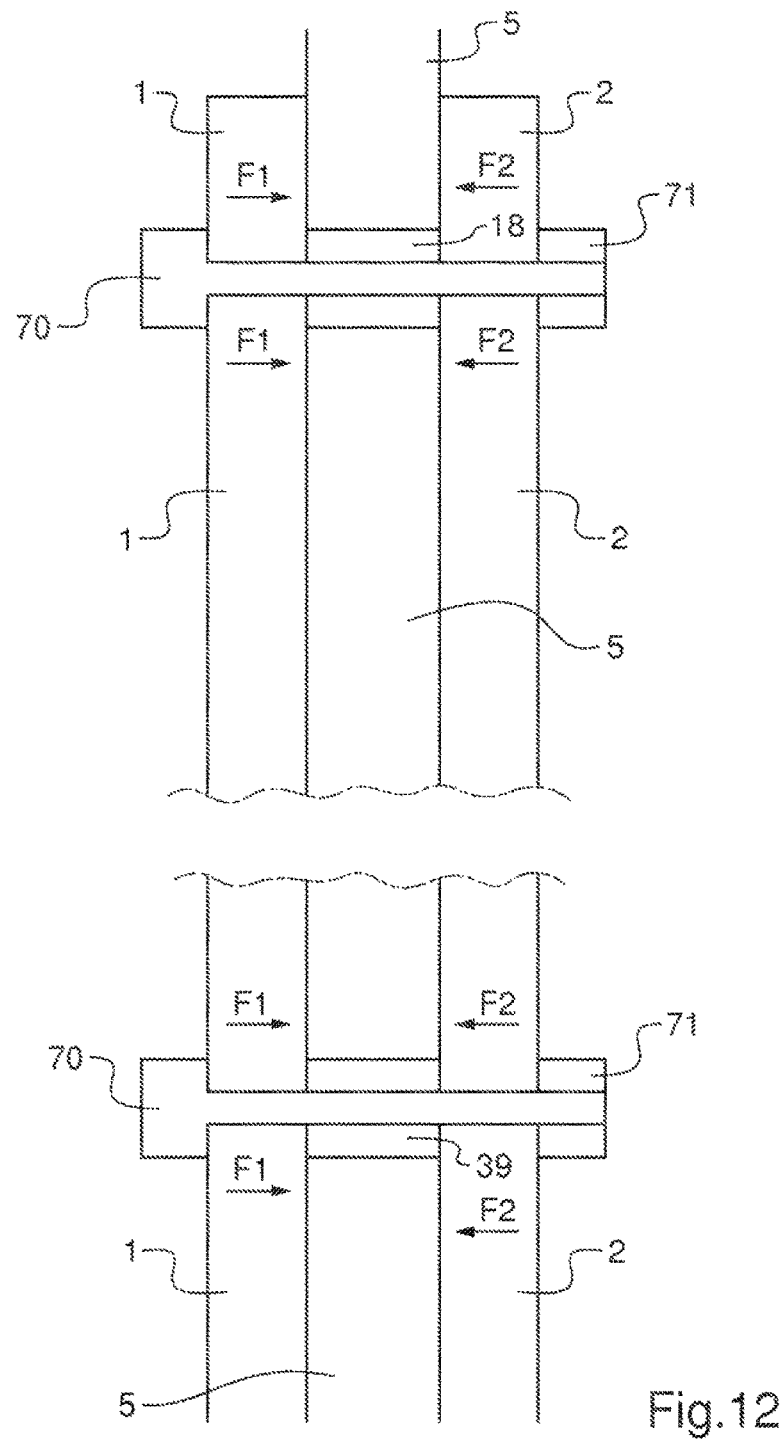
FIG. 12 very schematically represents an example of an assembly with the inner and outer panels tightly sandwiching the cold room wall so as to provide a self-supporting assembly.

FIG. 12 very schematically represents an example of mounting the inner and outer panels in a sandwich enclosing the wall of the cold room in a self-supporting assembly. Through the cooperation of long screws 70 passing through the wall 5 of the cold room 6 with the nuts 71 screwed onto the long screws 70, the outer panel 1 is pressed and clamped against the wall 5 of the cold room 6 with a force F1, and the inner panel 2 is pressed and clamped against the wall 5 of the cold chamber 6 with a force F2. The clamping forces F1 and F2, respectively of the outer 1 and inner 2 panels, against the wall 5 of the cold chamber 6 are sufficient to hold the assembly in place, despite the weight of the various components pre-mounted on the outer 1 and inner 2 panels. The long screws 70 pass freely through the wall 5 of the cold chamber 6 in passages 18 and 39 of substantially larger size than the diameter of these long screws 70.

Of course, the invention is not limited to the examples and the embodiment described and represented, but can be the object of numerous variants accessible to persons skilled in the art.

The invention claimed is:
1. A liquid yeast dispensing device for dispensing liquid yeast in a bakery, comprising:
   an inner panel (2) of a refrigerated chamber (6), onto which is pre-mounted an inner circuit (20) for the flow of liquid yeast which is to be connected to a liquid yeast vessel (4) of the refrigerated chamber (6) and which comprises a pumping unit (21);
   an outer panel (1) of the refrigerated chamber (6), onto which are pre-mounted:
     a liquid yeast metering device (16);
     a metering table (10) for receiving a container (3) to be filled with an amount of liquid yeast metered by said liquid yeast metering device (16);
   said inner panel (2) and said outer panel (1) being structured so as to be attached sandwiched onto a wall (5) of said refrigerated chamber (6);

said liquid yeast metering device (16) being intended to be connected, through the wall (5) of the refrigerated chamber (6), to said inner circuit (20), a cleaning tank (12) pre-mounted on said outer panel (1) and located under said metering table (10);

a wash water metering device (17) pre-mounted on said outer panel (1), for supplying said cleaning tank (12) and connected to a wash water inlet (19).

2. The liquid yeast dispensing device according to claim 1, comprising, downstream of said wash water metering device (17), a wash water outlet (13) which can be manually directed either toward said tank (12) or towards an internal drainage tube (64) that is not in communication with the bottom of said vessel (12).

3. The liquid yeast dispensing device according to claim 2, wherein said tank (12) has an outlet (13) to a wash water recirculation circuit and wherein said tank (12) is ring-shaped, arranged around said internal drainage tube (64).

4. The liquid yeast dispensing device according to claim 3, wherein said outlet (13) has a pivotable part (14), preferably with at least two bends.

5. The liquid yeast dispensing device according to claim 1, wherein said liquid yeast metering device (16) and said wash water metering device (17) are both connected to said outlet (13).

6. The liquid yeast dispensing device according to claim 1, wherein no welding is carried out during installation of the inner and outer panels (1, 2) on the wall (5) of the refrigerated chamber (6).

7. The liquid yeast dispensing device according to claim 1, wherein said liquid yeast metering device (16) is automatic and is associated with a weighing system (11) which is integrated with said metering table (10).

8. The liquid yeast dispensing device according to claim 1, further comprising a liquid yeast flowmeter (22) pre-mounted on the inner panel (2), said inner circuit (20) comprising a branch line (23) connected to said flowmeter (22).

9. The liquid yeast dispensing device according to claim 1, wherein said inner circuit (20) comprises another branch line (33) to pass through the wall (5) of the refrigerated chamber (6).

10. The liquid yeast dispensing device according to claim 1, wherein said inner circuit (20) further comprises a water connection (28) pre-mounted on the inner panel (2), to be connected to a water inlet (29).

11. The liquid yeast dispensing device according to claim 1, wherein said inner circuit (20) comprises a yeast filter (26) located downstream of the pumping unit (21).

12. The liquid yeast dispensing device according to claim 1, wherein the inner panel (2) comprises pipe and hose connections (30) which are pre-mounted on the inner panel (2).

13. The liquid yeast dispensing device according to claim 12, further comprising one or more valves (24, 25) pre-mounted on the inner panel.

14. A system for dispensing liquid yeast in a bakery, comprising:

a refrigerated chamber (6);

a liquid yeast vessel (4) located within said refrigerated chamber (6);

a liquid yeast dispensing device according to claim 1, which is mounted so as to sandwich a wall (5) of said refrigerated chamber (6) and which is connected to said vessel (4) so as to be able to pump liquid yeast from said vessel (4).

15. The system for dispensing liquid yeast in a bakery according to claim 14, wherein the mounting of said device for dispensing liquid yeast is self-supporting by the pressure of the inner (2) and outer (1) panels against said wall (5) of the refrigerated chamber (6).

16. The system for dispensing liquid yeast in a bakery according to claim 14, wherein said vessel (4) is independently movable relative to said refrigerated chamber (6).

17. The system for dispensing liquid yeast in a bakery according to claim 16, wherein the capacity of said liquid yeast vessel (4) is between 100 liters and 1000 liters, preferably between 100 liters and 600 liters or between 300 liters and 1000 liters, more preferably between 300 liters and 600 liters.

18. The system for dispensing liquid yeast in a bakery according to claim 14, wherein said system is a remote dispensing system comprising a liquid yeast flowmeter (22) pre-mounted on said inner panel (2) and a pipe (50) at least several meters in length, extending downstream of the flowmeter (22).

19. The system for dispensing liquid yeast in a bakery according to claim 18, further comprising a slave cabinet (75) for setting the yeast amount setpoint, connected to a master cabinet (7) for setting the yeast amount setpoint located on the same wall as said outer panel (1).

20. The system for dispensing liquid yeast in a bakery according to claim 14, further comprising a recirculation connection (39) which is connected on the outer panel (1) side to an outlet of a cleaning tank (12) and which is intermittently connected on the inner panel (2) side to the pumping unit (21).

21. The system for dispensing liquid yeast in a bakery according to claim 14, wherein the liquid yeast is either a yeast starter or actual liquid yeast.

22. The system for dispensing liquid yeast in a bakery according to claim 14, wherein the temperature of said refrigerated chamber (6) is regulated and is between 1° C. and 7° C., and preferably between 2° C. and 4° C.

23. A method for installing a system for dispensing liquid yeast in a bakery according to claim 14, characterized in that holes corresponding to connecting passages between the inner (2) and outer (1) panels, traversing a wall (5) of the refrigerated chamber (6), are represented on a template of holes to be drilled in the wall (5) of the refrigerated chamber (6), said template being attached to said wall (5) of the refrigerated chamber (6) to guide the drilling of said holes.

24. The system for dispensing liquid yeast in a bakery according to claim 18, wherein said system is a remote dispensing system comprising a liquid yeast flowmeter (22) pre-mounted on said inner panel (2) and a pipe (50) greater than 10 meters, extending downstream of the flowmeter (22).

25. The system for dispensing liquid yeast in a bakery according to claim 21, wherein the liquid yeast is either a stabilized yeast starter or an actual stabilized liquid yeast.

26. The liquid yeast dispensing device according to claim 2, wherein said tank (12) has an outlet (13) to a wash water recirculation circuit and wherein said tank (12) is cylindrical, arranged around said internal drainage tube (64).

27. A method for dispensing bakery liquid yeast ready to be used in a bakery, comprising:

providing bakery liquid yeast ready to be used in a bakery to be dispensed to a bakery liquid yeast dispensing device, which comprises an inner panel (2) of a refrigerated chamber (6), onto which is pre-mounted an inner circuit (20) for the flow of liquid yeast which is to be connected to a liquid yeast vessel (4) of the refrigerated chamber (6) and which comprises a pumping unit (21);
an outer panel (1) of the refrigerated chamber (6), onto which are pre-mounted:
   a liquid yeast metering device (16);
   a metering table (10) for receiving a container (3) to be filled with an amount of liquid yeast metered by said liquid yeast metering device (16);
said inner panel (2) and said outer panel (1) being structured so as to be attached sandwiched onto a wall (5) of said refrigerated chamber (6);
said liquid yeast metering device (16) being intended to be connected, through the wall (5) of the refrigerated chamber (6), to said inner circuit (20); and
dispensing said bakery liquid yeast.

* * * * *